June 28, 1955            J. H. MILLER            2,712,127
REMOTE READING ELECTRICAL SYSTEM
Filed June 2, 1954            3 Sheets-Sheet 1
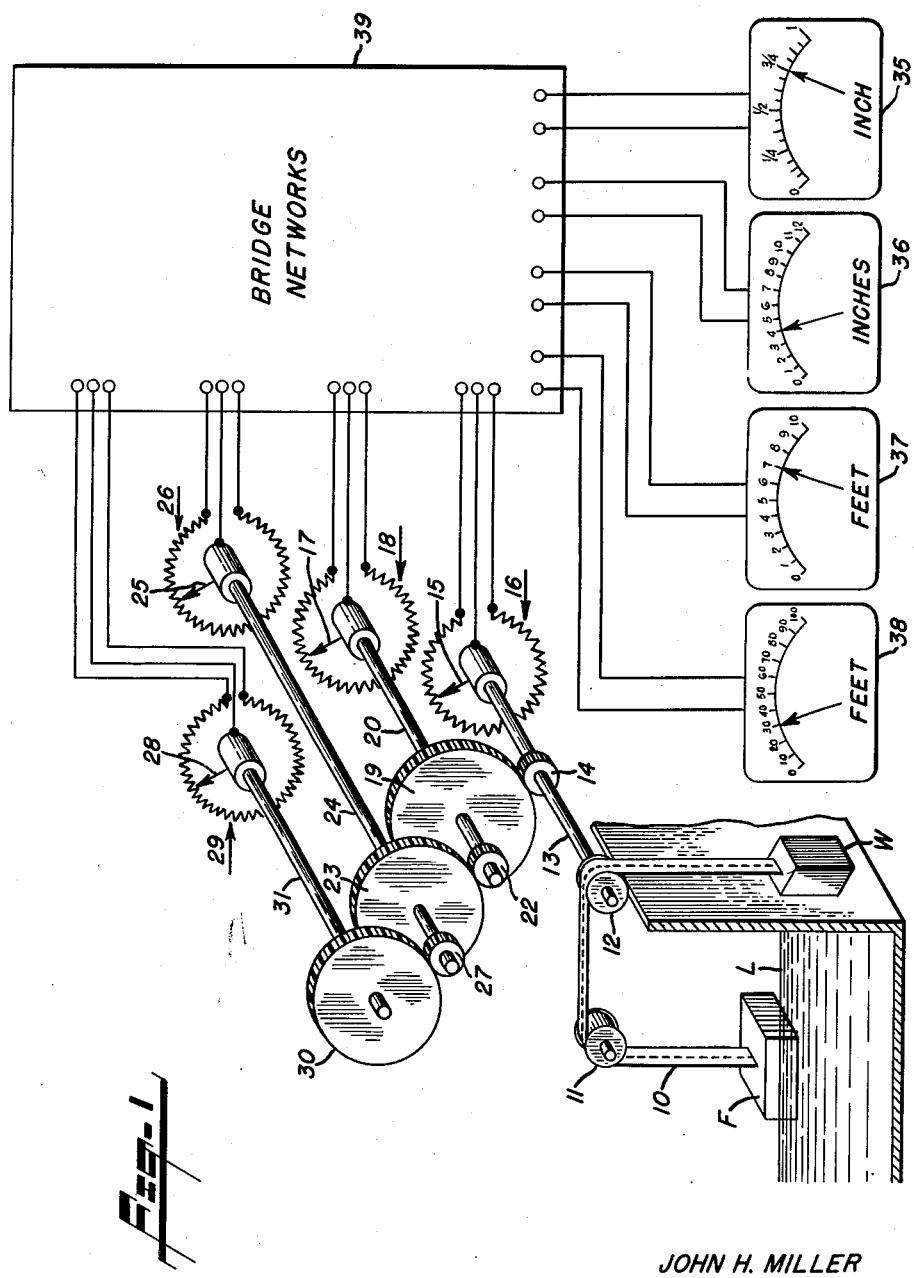
JOHN H. MILLER
INVENTOR.
BY
Rudolph J. Juick
ATTORNEY

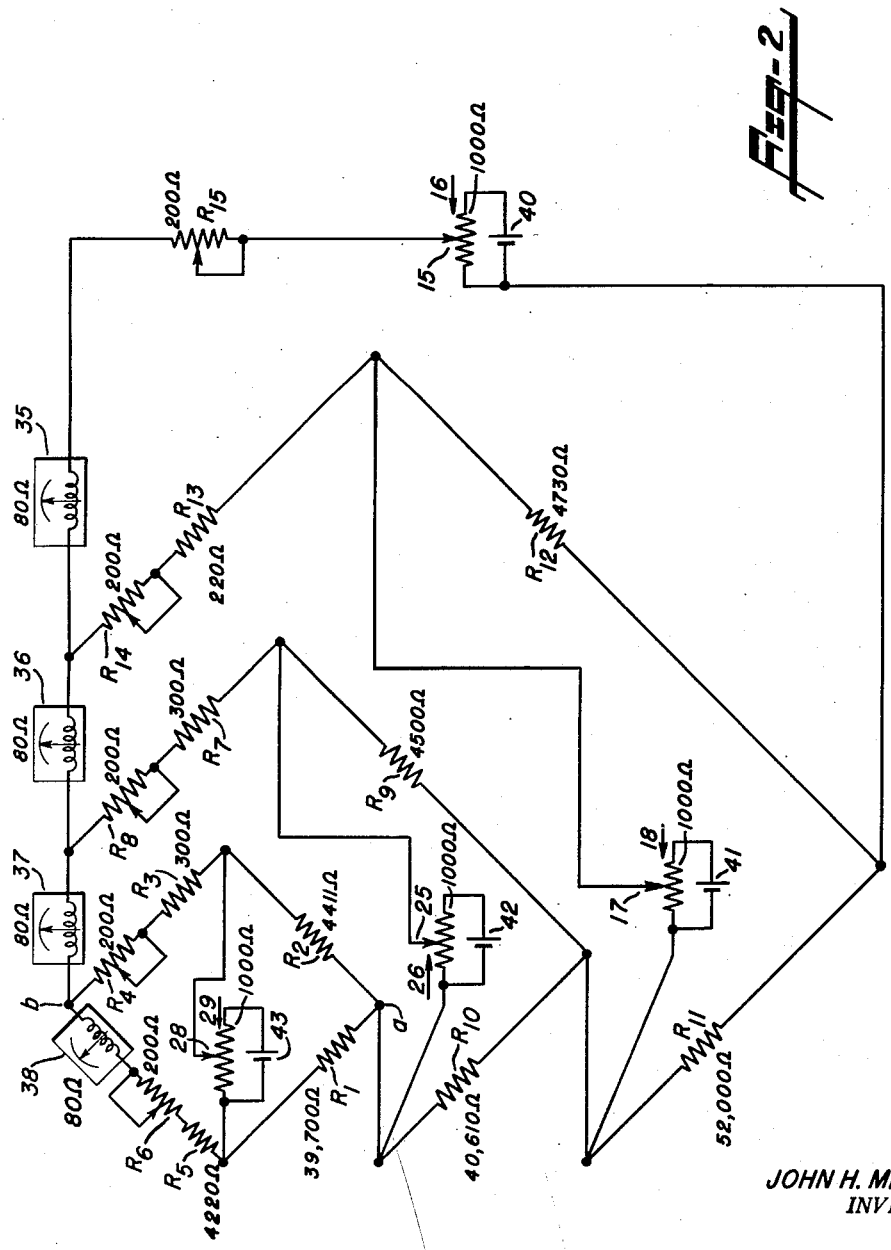

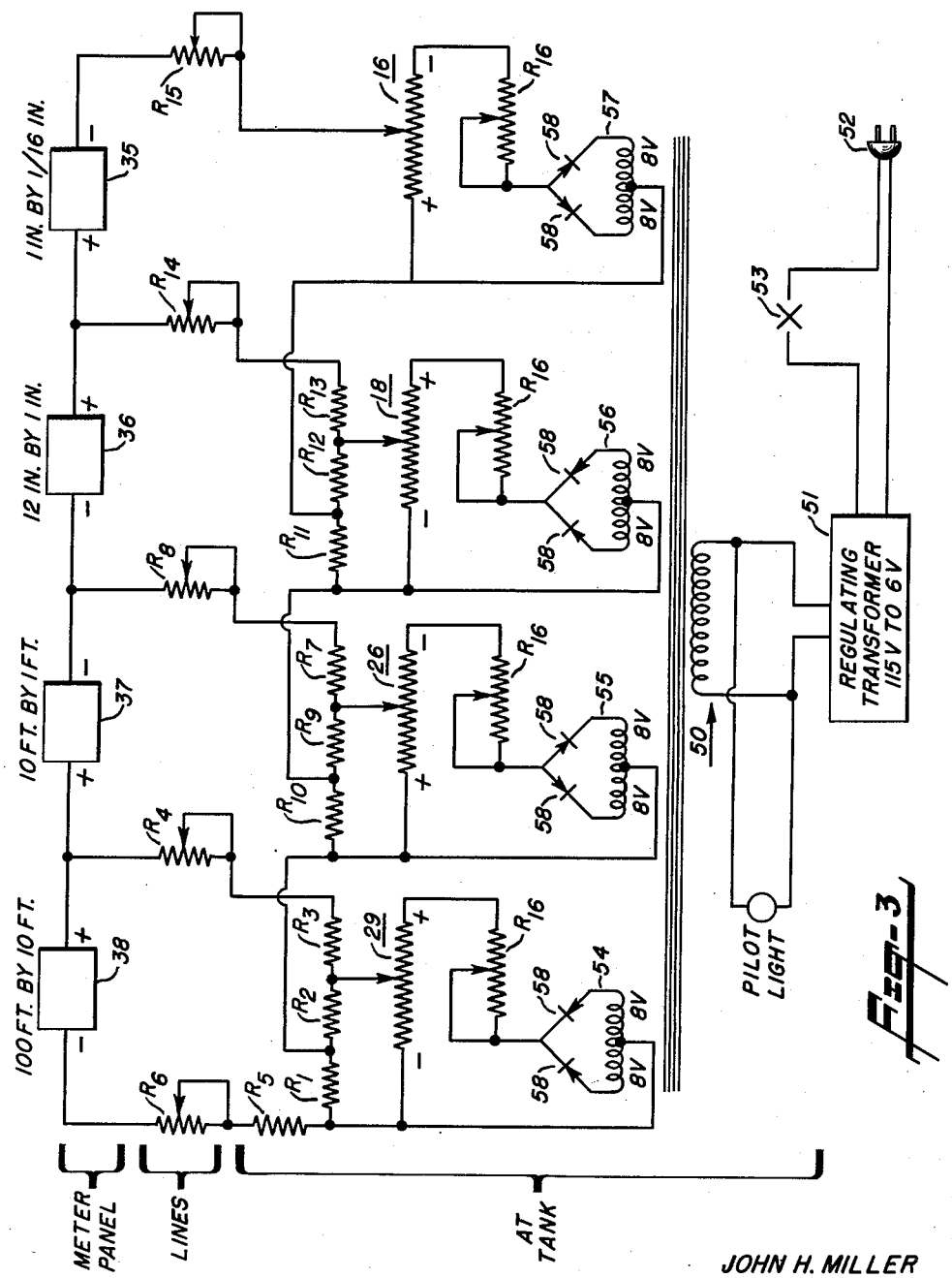

United States Patent Office 2,712,127
Patented June 28, 1955

2,712,127

REMOTE READING ELECTRICAL SYSTEM

John H. Miller, Short Hills, N. J., assignor to Weston Electrical Instrument Corporation, Newark, N. J., a corporation of New Jersey Application June 2, 1954, Serial No. 433,856

7 Claims. (Cl. 340—177)

This invention relates to remote reading electrical systems and more particularly to a novel system including a plurality of indicating instruments, each providing separate indications of the condition of a variable factor and related multiples thereof.

While the invention is adaptable for use in any arrangement requiring a remote indication of a variable condition, the following description will be restricted to one specific application, that is, the remote gauging of the level of a liquid within a tank and wherein the electrical indicators provide a continuous reading of the liquid level in both feet and inches.

Numerous arrangements exist for indicating the level of a liquid at a remote point by electrical means. One such system, for example, employs a pair of shafts driven by gears having a predetermined tooth ratio, the first shaft being rotatable directly in response to the vertical movement of a float disposed in the liquid. Associated with each shaft is a circular potentiometer whereby potentials are obtained which are directly related to the degree of rotation of each shaft and such potentials are utilized to energize remotely-positioned meters having suitably calibrated scales, as in "feet" and "inches." The difficulty inherent in the prior systems lies in the fact that the "foot" indicator (and the slider of the associated potentiometer) moves only slightly from, say, 3 feet, 11¾ inches to 4 feet, ¼ inch. Such slight normal movement of the "foot" indicator results in an ambiguous reading whereby the indication of the instrument may be taken incorrectly. This condition is aggravated by such factors as play in the gearing system and friction between the various moving parts.

In my co-pending United States patent application, Serial No. 251,359, filed October 15, 1951, and entitled "Remote Reading Electrical System," I disclose a telemetric indicating system for eliminating reading errors in a liquid level indicator. Such system includes two electrical indicating instruments, one having a scale calibrated in "feet" and the other having a scale calibrated in "inches." The "foot" instrument is provided with two movable coils arranged in electrical opposition and a bucking voltage, which at all times equals the voltage applied to the single movable coil of the "inch" instrument, is applied to one of the two coils. Consequently, the "inch" instrument responds directly to the movement of the float whereas the "foot" instrument functions in a step-by-step manner, that is, the pointer of the "foot" instrument jumps to the adjacent foot mark on the scale as the pointer of the "inch" instrument moves beyond the 12 inch scale mark. Such level indicating system included a single power supply which necessarily has to be regulated quite accurately and each of the indicating instruments and associated potentiometers should be accurate to within 1% in order to obtain a high overall system accuracy. The required accuracy is attained at the expense of relatively costly instruments and potentiometer rheostats.

The present invention involves a plurality of indicating instruments and associated potentiometer rheostats each of such a nature that errors of several percent in each element would not be reflected in the overall errors of the level measurement of greater than ⅟₁₆ inch in 100 feet. Instead of using a double wound movable coil, a bridge network is used whereby a first meter can affect the second meter to a controlled degree but the second meter cannot affect the first meter because of the balanced character of the bridge network. Although the circuit complexity is greater than that disclosed in my above-referenced co-pending application, much simpler components can be used to attain the desired end result. Further, because of the moderate order of accuracy required in the components, the voltage control need have only a moderate accuracy thereby permitting the use of a voltage supply obtained from a commercially available and inexpensive A.-C. voltage regulator.

An object of this invention is the provision of apparatus by means of which a physical displacement of a member in response to changes in a variable condition is converted into a corresponding voltage and such voltage, in turn, is converted into visible indications of the instantaneous state of the variable condition or converted into a control function to maintain the condition at a predetermined value.

An object of this invention is the provision of an electrical measuring system affording a continuous progressive indication of the variations in a factor on one scale of values and a step-by-step indication of the variation on a multiplied scale of values.

An object of this invention is the provision of an electrical system for indicating the variations in a factor, said system including a plurality of conventional direct current indicating instruments interposed in a complex Wheatstone bridge network whereby the first instrument controls the indication of the second instrument to a controlled degree but the second instrument has no effect upon the first.

An object of this invention is the provision of an electrical system comprising a plurality of interconnected Wheatstone bridges, separate sources of variable voltage connected to the input terminals of each bridge, and a plurality of indicating instruments, the first instrument being connected in the input circuit of the first bridge and having a pointer continuously responsive to the variable voltage applied to such bridge and cooperating with a scale of calibrated values, a second instrument connected in the input circuit of the second bridge and having a pointer motionally responsive in step-by-step manner over a scale calibrated in multiples of the first instrument scale, a third instrument connected in the input circuit of the third bridge and having a pointer motionally responsive in step-by-step manner over a scale calibrated in multiples of the second instrument scale, etc.

An object of this invention is the provision of an electrical remote indicating system comprising a plurality of interconnected Wheatstone bridges, a plurality of direct current indicating instruments having calibrated scales of predetermined multiple ratios, and simultaneously variable, independent sources of voltage connected to the input junctions of each bridge, the instruments being so connected in the bridge networks that each instrument affects the indication of the next succeeding instrument to a controlled degree and the bridge networks being so balanced that the instruments do not affect each other in a reverse sense.

These and other objects and advantages will become apparent from the following description when taken with the accompanying drawings. It will be understood the drawings are for purposes of illustration and are not to be construed as defining the scope or limits of the invention, reference being had for the latter purpose to the claims appended hereto.

In the drawings wherein like reference characters denote like parts in the several views:

Figure 1 is a diagrammatical showing of a liquid level gauge made in accordance with this invention;

Figure 2 is a schematic circuit diagram arranged to show the interrelated Wheatstone bridges and the specific connections to the indicating instruments; and Figure 3 is a circuit diagram of the level gauge.

Reference is now made to Figure 1. A float F is secured to one end of a flexible, perforated tape 10 that passes over a pulley 11 and a sprocket 12, said tape having a balance weight W secured to the other end. The sprocket 12 is secured to a shaft 13 whereby vertical movement of the float, in response to changes in the level of a liquid L, produces rotation of the shaft. Secured to the shaft 13 is a gear 14 and a slider 15 of the circular potentiometer 16. Similarly, the slider 17, of the circular potentiometer 18, and the gear 19 are secured to the shaft 20, said gear 19 meshing with the gear 14 whereby rotation of the shaft 13 also results in a predetermined relative rotation of the two otherwise independent sliders 15 and 17. A pinion gear 22 is also secured to the shaft 20 and is in mesh with the gear 23 secured to the shaft 24. The latter shaft 24 has secured thereto the slider 25 of the circular potentiometer 26 and a pinion gear 27. Similarly, the slider 28, of the circular potentiometer 29, and the gear 30 are secured to the shaft 31, said gear 30 being in mesh with the pinion gear 27. It will be apparent that vertical movement of the float results in rotation of the entire gearing system and a predetermined relative rotation of each of the four potentiometer sliders 15, 17, 25 and 28. The gearing system is biased by the weight W such that an upward movement of the float, in response to a rising of the level of the liquid, will result in a clockwise rotation of the shaft 13. On the other hand, the float has sufficient mass to overcome such bias of the gearing system whereby a downward movement of the float, in response to a lowering of the liquid level, will result in a counterclockwise rotation of the shaft 13.

In the particular example being described, the circumference of the sprocket 12 is one inch, whereby a one inch movement of the float F produces one complete revolution of the shaft 13 and the ratio of the meshed gears 14 and 19 is 12 to 1. The ratio of the meshed gears 22, 23 and 27, 30 is, in each case 10 to 1. Thus, one revolution of the shaft 13 results in 360 degree rotation of the slider 15 of the potentiometer 16 and one-twelfth of a full revolution of the slider 17 of the potentiometer 18. Since the system is so arranged that a complete revolution of the slider 15 corresponds to a one inch lowering or rising of the float, the indicating instrument energized by the voltage output of the potentiometer 16 can have a scale calibrated in fractions of an inch with the top scale line marked one (1) inch. Such an instrument is identified by the numeral 35. Similarly, the slider 17 of the potentiometer 18 will rotate only one-twelfth ($\frac{1}{12}$) of a complete revolution each time the slider 15 rotates 360 degrees whereupon an instrument energized by the voltage output of the potentiometer 18 will have a scale calibrated directly in inches with a top scale line marked twelve (12) inches, as shown by the instrument identified by the numeral 36.

It is well here to point out that all of the potentiometers 16, 18, 26 and 29 are of the full rotation type, i. e., their sliders remain in contact with the fixed resistance wires through an angular rotation of very nearly 360 degrees, the open positions being restricted to a very small angle. Consequently, the voltage output of each potentiometer will increase from zero to a maximum value and will drop immediately to zero as the associated slider moves from one end of the resistance winding to the other.

Carrying on a description of the gearing system and potentiometers, ten rotations of the slider 17 of the potentiometer 18 will produce one complete revolution of the slider 25 of the potentiometer 26. All circuit constants being equal, the scale of the indicating instrument 37 will, therefore, have a calibrated range of 10 feet. Similarly, the scale of the instrument 38 will have a calibrated range of 100 feet. As illustrated in Figure 1, the level of the liquid L is 37 feet 4¾ inches.

The system being described is primarily adapted for the remote indication of liquid level with fairly high accuracy. The difficulty inherent in systems of this class lies in the fact that the pointer of the "foot" indicating instrument moves only slightly from say, the 3 feet, 11¾ inch mark to the 4 feet, ¼ inch mark. Such slight movement of the "foot" indicator results in an ambiguous reading whereby the indication of the instrument may be taken incorrectly. This condition is aggravated by such factors as play in the gearing system and friction between the various movable parts. In my above-referenced co-pending application I disclose one system for eliminating such ambiguous readings by providing two coils in the foot instrument, said coils being connected in electrical opposition whereby the point of the "foot" instrument moves in a step-by-step manner across the scale. More specifically, the pointer of the "foot" instrument operates in jumps from one scale mark to the other as the preceeding "inch" instrument passes through the top mark position. The present system operates in a similar step-by-step, or jump, manner but I have eliminated the relatively costly dual winding of the instruments and the need for highly accurate potentiometers. While a detailed description of the electrical network is given hereinbelow I here wish to point out that the potentiometers 16, 18, 26 and 29 and the indicating instruments 35—38 are connected in a complex bridge network in such manner that the instrument 35 responds directly and continuously to movement of the float whereas the pointer of the instrument 36 remains stationary and alined with the appropriate scale mark until the pointer of the instrument 35 passes beyond the scale range. Assuming a rising level of the liquid, the pointer of the instrument 35 will move upscale as the voltage output of its associated potentiometer 16 increases. After such pointer reaches the one (1) inch (top scale) mark, the voltage output of the potentiometer 16 drops to zero. At this instant the pointer of the instrument 36 jumps to the next higher scale mark and the pointer of the instrument 35 drops to the zero scale position. Similarly, when the pointer of the instrument 36 drops back from the twelve (12) inch to the zero scale position the pointer of the instrument 37 will jump to the next higher mark. Also, when the pointer of the instrument 37 drops back from the ten foot to the zero scale position the pointer of the instrument 38 will jump to the next higher scale mark. Upon a decreasing liquid level a reverse action takes place, that is, the pointer of the instrument to the left will jump to the next lower scale mark when the pointer of the instrument immediately to the right moves from its zero to the top mark position. This interrelated jump action of the instruments, having scales calibrated in multiples of the primary instrument, is accomplished electrically by a novel bridge network represented by the block 39 in Figure 1. Briefly, the jump action of the instruments 36, 37 and 38 is obtained by feeding to such instruments a portion of the current which flows through the instrument immediately to the right. Such current is fed through a bridge network whereby the meter to the right affects the one to the left, in reverse polarity, to hold the pointer of the latter stationary. With a gear ratio of 12:1 between the potentiometers 18 and 16 one twelfth ($\frac{1}{12}$) of the current flowing in the meter 35 is passed through the meter 36. Similarly, one tenth ($\frac{1}{10}$) of the current flowing in the meter 36 is fed to the meter 37 and one tenth ($\frac{1}{10}$) of the current flowing in the meter 37 is fed to the meter 38. These fractional currents are, of course, opposite to the main current flowing through instruments as a result of the individual output voltages of the respectively associated potentiometers 18, 26 and 29.

Reference is now made to Figure 2 which is a diagram of the entire apparatus shown schematically to facilitate a proper understanding thereof. Toward this same end, the potentiometers 16, 18, 26 and 29 are shown in straight line form and each is shown energized by equal, constant voltage sources, specifically the batteries 40, 41, 42 and 43. It will be noted that the electrical network comprises three Wheatstone bridges, the left hand bridge forming an arm of the center bridge and the center bridge, in turn, forming an arm of the right hand bridge.

Consideration will first be given to the left hand bridge. The fixed resistors $R_1$ and $R_2$ form two adjacent bridge arms. The third bridge arm consists of the fixed resistor $R_3$ and the adjustable resistor $R_4$ and the fourth bridge arm consists of the fixed resistor $R_5$, adjustable resistor $R_6$ and the movable coil of the indicating instrument 38. I here wish to point out that the indicating instruments 35, 36, 37 and 38 are of the permanent magnet-movable coil type and, in the illustrated arrangement, each movable coil has a resistance of 80 ohms. The ohmic values of the bridge resistors and of the energizing potentiometer 29 are marked on the drawing, the final values of the adjustable resistors $R_3$ and $R_6$ being set at the factory to properly balance the bridge. Since the movable coil of the instrument 38 is connected in one arm of the bridge it will be apparent that any change in the output voltage of the potentiometer 29 will result in a corresponding deflection of the instrument pointer, the bridge resistor arms being so proportioned that the maximum output voltage range of the potentiometer will result in a full scale deflection range of the instrument pointer. Specifically, one complete revolution of the potentiometer slider 28 is equivalent to the full scale instrument range of 0–100 feet. The current flowing as a result of the output voltage of the potentiometer divides between the two upper and the two lower bridge arms in inverse proportion to the total resistance of said arms. Thus, regardless of the voltage variations of the potentiometer the voltage across the opposed bridge junctions $a$ and $b$ remain constant. Such being the case, it is apparent that if the entire left hand bridge is made one arm of the center bridge the voltage variations of the potentiometer 29 will have no effect upon the operation of the center bridge.

Such actually is the case as it is clear that the entire left hand bridge and the indicating instrument 37 are connected in series to form one arm of the center bridge. The adjacent center bridge arm consists of the fixed resistor $R_7$ and the adjustable resistor $R_8$ and the remaining center bridge arms consist of the resistor $R_9$ and $R_{10}$. Inasmuch as the potentiometer 26 is connected across opposite bridge junctions a change in the voltage output of the potentiometer will cause a corresponding change in the current flowing in the bridge arm that includes the instrument 37 whereby the instrument responds directly to the potentiometer output voltage. The ohmic values given to the arms of the center bridge are such that the pointer of the instrument will traverse the full scale range, 0–10 feet, upon one complete revolution of the potentiometer 26.

Since the left hand bridge is connected in series with the instrument 37 the current flowing through such instrument will be divided to flow through the left arms and the right arms of the left hand bridge. It will be noted that the total resistances of the left and right bridge arms are 44,200 ohms and 4,910 ohms respectively as follows:

| | | | |
|---|---|---|---|
| $R_1$ | =39,700 | $R_2$ | =4,410 |
| $R_5$ | = 4,220 | $R_3$ | = 300 |
| $R_6$ | = 200 | $R_4$ | = 200 |
| Instrument 38= | 80 | | |
| | 44,200 ohms | | 4,910 ohms |

Thus, one tenth of the total current flowing through instrument 37 flows through the instrument 38 and such current is opposite to that flowing in the instrument 38 by reason of the output voltage of the potentiometer 29. It will be seen, therefore, that the deflection of the pointer of the instrument 38 is determined by the difference between the output voltage of the potentiometer 29 and one tenth of the output voltage of the potentiometer 26. Since the ratio of the gears controlling the rotation of these potentiometer sliders is 10:1 and since equal voltages are applied to each potentiometer by the individual batteries 43, 42, the opposed potentials applied to the movable coil of the instrument 38 will be equal throughout the first complete revolution of the potentiometer sliders.

Specifically, assume that the two potentiometers start with their sliders in the zero output voltage position. A rising liquid level will cause the sliders 25 and 28, of the respective potentiometers 26 and 27, to move along the resistance windings thereby applying increasing voltages to the diagonals of the associated bridges. Inasmuch as the slider 25 moves at a rate 10 times that of the slider 28, the output voltage of the potentiometer 25 increases 10 times as rapidly. As the output voltage of the potentiometer 26 increases the pointer of the instrument 37 moves up scale. If we now assume that the voltage of the battery 42 is 1 volt, one (1) volt will be impressed across the diagonals of the center bridge when the circular potentiometer rotates very nearly 360 angular degrees. At this voltage output the pointer of the meter 37 will be alined with the top mark on the scale, that is, the 10 foot mark. At the same time, the voltage output of the potentiometer 29 will be 0.1 volt but this voltage is bucked at the instrument 38 by $\frac{1}{10}$ of 1 or 0.1 volt developed across the left hand bridge diagonals $a$, $b$. Consequently, the pointer of the meter 38 remains alined with the zero scale mark. Upon a slight further rotation of the gearing system the slider of the potentiometer will pass the gap between the ends of the fixed resistance winding to the zero output voltage position. When this happens the pointer of the instrument 37 drops to the zero scale mark and the removal of the equivalent bucking voltage from the instrument 38 causes the pointer of this instrument to jump to the 10 foot mark on the scale. As the level of the liquid continues to rise the pointer of the instrument 37 moves up scale and when the slider of the potentiometer 26 passes through 360 angular degrees the pointer of this instrument drops to zero and that of the instrument 38 jumps to the 20 foot scale mark.

The action just described is similar for the right hand bridge; the two arms of this bridge being constituted by the resistors $R_{11}$ and $R_{12}$, the third bridge arm being constituted by the fixed resistor $R_{13}$ and the adjustable resistor $R_{14}$; and the fourth bridge arm being constituted by the instrument 36 and the combined left hand and center bridges. The network is completed by the potentiometer 16 connected to the opposed, vertical diagonals of the right hand bridge through the instrument 35 and the adjustable resistor $R_{15}$.

It is pointed out that the above example is here given for purposes of explanation and that in the practical network each bridge is energized by an eight (8) volt source in order to utilize indicating instruments having a sensitivity of one (1) milliampere.

It is particularly to be noted that the instrument 38 is connected in one arm of the left hand bridge; that the instrument 37 is connected in one arm of the center bridge; that the instrument 36 is connected in one arm of the right hand bridge, and that the primary instrument 35 is connected outside of the bridge network. Thus, the instrument 35 will follow directly the voltage output variations of the associated potentiometer 16, whereas each of the instruments 36, 37 and 38 will be affected by the voltage output of the associated potentiometer and a portion of the voltage developed by the potentiometer immediately to the right. In other words, the bridge network and the specific electrical connection of the instruments therein, results in an arrangement whereby each meter affects the operation of the meter to its left to a controlled degree but has no effect upon the meter to its right because of the balanced character of the inter-related bridges.

The operation of the entire apparatus will now be described with specific reference to Figure 2 and assuming the level of the liquid initially is zero and the float rests upon the bottom of the storage tank. Under this condition, the sliders of all potentiometers are at that end of the associated, fixed resistance windings wherein the potentiometer voltage output is zero. Therefore, all four instruments will indicate zero. As the level of the liquid rises the vertical movement of the float imparts rotation to the entire gearing system and the output voltages of each of the potentiometers increase simultaneously but at rates determined by the ratios of the gears controlling movement of the associated potentiometer sliders. The instrument 35 responds smoothly to the voltage output of the potentiometer 16 and when such voltage reaches a maximum value of, say, X, the pointer of this instrument will register with the top scale mark, 1 inch, representing a liquid level of one (1) inch. At this point the voltage output of the potentiometer 18 will be $$\frac{X}{12}$$

by reason of the twelve to one gear ratio between the gears 14, 19, see Figure 1. This voltage $$\frac{X}{12}$$

is applied to that arm of the right hand bridge which includes the instrument 36 and its polarity is such as to tend to rotate the pointer of instrument 36 in an up scale direction. However, the bridge network is so balanced that one-twelfth (1/12) of the total current flowing through the instrument 35 flows through that same arm of the right hand bridge. Consequently, the voltage developed across this particular bridge arm by such current flow develops a voltage of $$\frac{X}{12}$$

across such arm and this voltage is equal and opposite to that generated by the potentiometer 18. Therefore, the pointer of the instrument 36 remains at the zero mark all the time the pointer of the instrument 35 moves up scale. Similarly, because of the 10:1 ratio between the gears 24 and 22 (see Figure 1) the voltage output of the potentiometer 26 is one-tenth (1/10) that of the potiometer 18, or $$\frac{X}{120}$$

This voltage is applied to the instrument 37 so as to tend to move the pointer up scale. However, an exactly equal reverse voltage $$\left(\frac{X}{120}\right)$$

is applied to the instrument 37 by reason of the 10:1 divison of the total current flowing through the instrument 36. This instrument, then, also remains at zero as the pointer of the instrument 35 moves up scale. Similarly, because of the 10:1 gear ratio between the gears 30 and 27 (Figure 1) the voltage output of the potentiometer 29 is $$\frac{X}{1200}$$

and such voltage tends to deflect the pointer of instrument 38 up scale. However, an exactly equal and opposite voltage $$\frac{X}{1200}$$

is applied across the instrument 38 by reason of the 10:1 division of the total current flowing through instrument 37 in the bridge arm of which the instrument 38 is a part.

When the level of the liquid just exceeds one (1) inch, the slider of the potentiometer 16 moves from one end of the associated, fixed resistance winding to the other. As this happens the voltage output of the potentiometer drops to zero and, consequently, the pointer of the instrument 35 returns to the zero scale mark. However, as this action takes place with respect to the potentiometer 16, the sliders of the other three potentiometers have merely rotated a fraction of an angular degree and the individual voltage outputs of these potentiometers remains substantial at the same values which obtained when the pointer of the instrument 35 registered with its top scale mark. The reduction of the output voltage of the potentiometer 16 to zero as the liquid level rises just above one (1) inch removes the bucking voltage effective across the instrument to its left; namely, the inch instrument 36. Since the value of this buckling voltage was exactly equal to the output voltage of the potentiomeer 18, and since the instrument 36 is adjusted so that each cardinal scale division is effectively equal to the full scale deflection of the instrument 35, the pointer of the instrument 36 immediately jumps to the next higher scale mark, or 1 inch. Inasmuch as the bucking voltages are still applied to the other two instruments 37, 38, these remain at zero indications.

Therefore, as the level of the liquid continues to rise, the pointer of the instrument 35 smoothly moves up scale. Each time the liquid level rises beyond one inch, the pointer of instrument 35 drops to zero and that of the instrument 36 jumps to the next scale mark.

When the liquid level rises to 12 inches the instrument 36 will indicate top mark. As the level of the liquid just exceeds 12 inches, the slider of the potentiometer 18 moves across the ends of the fixed resistance winding and the voltage output drops to zero. This removes the bucking voltage from the instrument 37 whereupon the pointer thereof jumps to the next higher scale mark; namely, one (1) foot. Here too, the instrument 37 is so calibrated that each cardinal scale mark corresponds to the full scale of the preceding instrument 36.

When, now, the level of the liquid continues to rise, the pointer of the instrument 35 moves up scale smoothly and drops to zero each time the liquid level increases one (1) inch; the instrument 36 jumps up scale in discrete steps each time the liquid level increases one (1) inch; and the pointer of the instrument 37 jumps up scale in discrete steps each time the liquid level increases one (1) foot. Similarly, the pointer of the instrument 38 jumps up scale each time the liquid level increases ten (10) feet. Thus, the level of the liquid at any instant is indicated by a reading of the four meters from left to right and as shown in Figure 1 the liquid level is 37 feet 4¾ inches.

Having given the above description of the network operation upon a rise in liquid level, it is believed the reverse action which takes place upon a decrease in liquid level will be understood without need of a detailed description. Suffice to say that as the liquid level decreases the pointer of the instrument 35 moves smoothly down scale until it reaches the zero scale mark after which it moves quickly to the top mark. At such time the pointer of the instrument 36 jumps to the next lower scale mark. When the liquid level decreases one (1) foot the pointer of the instrument 36 jumps to the next lower scale mark, etc.

It will now be apparent that the jumping action of the instrument 36, 37 and 38 is obtained by feeding back a portion of the current flowing through the instrument immediately to the right through a novel bridge network whereby the meter to the right affects the one to its left, in reverse polarity and in a controlled degree, but the current flowing in the meter to the left has no effect upon the meter to its right.

The ohmic values identified with the resistors, instruments and potentiometers, shown in Figure 2, and the scale ranges shown in Figure 1, represent one practical arrangement of the apparatus. The adjustable resistors disposed in the bridge arms, Figure 2, are set at the factory to properly balance the bridges and to make the instrument pointer track with the associated scale calibrations. Once so set no further adjustments need be made in the apparatus. Those skilled in this art will understand that the particular scale ranges shown in the Figure 2 arrangement are only specific to a particular set of conditions and that the instrument scales can be calibrated in different ratio ranges, or in different units as required by a particular application, it being only necessary to assign correct values to the bridge arm resistors and to the gear ratios of the driving gear train.

Figure 3 is an actual wiring diagram of the apparatus shown schematically in Figure 2; like reference characters being applied to the like components. Power to energize the apparatus is obtained from a transformer 50 having its primary winding connected to a regulating transformer 51 which, in turn is connectable to a conventional 120 volt, 60 cycle power line by means of the connector plug 52 through the line switch 53. The transformer has four isolated secondary windings 54, 55, 56 and 57, each winding being center tapped and the ends of each winding are connected together through a pair of germanium diodes 58 to provide four independent and equal sources of rectified voltage. These voltage sources energize the bridges and correspond to the batteries 40—43 shown in the schematic diagram of Figure 2. It will be noted that the potentiometers 16, 18, 26 and 29 are individually connected to the voltage sources through the adjustable resistors $R_{16}$ and that the voltage polarities of the potentiometers 16 and 26 are the same whereas that of the potentiometers 18 and 29 are reversed. The reason for this is that the gearing arrangement (see Figure 1) which imparts a clockwise rotation to the sliders of the potentiometers 16 and 26 and a counterclockwise rotation to the sliders of the potentiometers 18 and 29 with a rising level of the liquid.

As is apparent from Figure 3, the instruments 35—38 can be located on a station panel and connected by five (5) lines to the bridges and power supply located at a remote tank.

Having now given a detailed description of my invention in accordance with the requirements of the patent statutes, those skilled in this art will be able to make certain changes and modifications as required to meet specific conditions. Such changes and modifications can be made without departing from the scope and spirit of the invention as set forth in the following claims.

I claim:

1. An electrical system responsive to changes in a variable condition comprising two potential sources that vary with changes in the condition but at different rates, a first four arm bridge energized by one of the potential sources, a second four arm bridge, one arm of which is constituted by the first bridge and energized by the second potential source, a first electro-magnetic device connected in the first bridge and normally responsive to changes in the first potential source, and a second electro-magnetic device connected in the second bridge and responsive to the second potential source, said electro-magnetic devices being so connected that a portion of the current flowing through the second device effects the operation of the first device but the normal current flowing through such first device does not affect the operation of the second device.

2. An electrical system responsive to changes in a variable condition comprising a first Wheatstone bridge energized by a first potential source that varies with changes in the condition; a first electro-magnetic device; a second Wheatstone bridge, one arm of the second bridge being constituted by the first bridge and the first electro-magnetic device; a second potential source energizing the second bridge and varying with changes in the condition at a rate different from that of the first potential source; and a second electro-magnetic device connected between a junction of the second bridge and the second potential source.

3. The invention as recited in claim 2, wherein the said first and second electro-magnetic devices are connected to the same junction of conjugate arms of the second bridge and wherein such conjugate arms of the second bridge have a total resistance ratio equal to the ratio at which the two potential sources vary.

4. The invention as recited in claim 3, wherein the said electro-magnetic devices are indicating instruments having deflection ranges equal to the ratio at which the two potential sources vary.

5. An electrical system responsive to changes in a variable condition comprising a first four arm bridge energized by a first potential source that varies with changes in the condition; a second four arm bridge energized by a second potential source that varies with changes in the condition, said first bridge forming one arm of the second bridge; a third four arm bridge energized by a third potential source that varies with changes in the condition, said second bridge forming an arm of the third bridge; a first electro-magnetic device connected in an arm of the first bridge; a second electro-magnetic device connected in series with the first bridge; a third electro-magnetic device connected in series with the second bridge; a fourth electro-magnetic device connected between an input junction of the third bridge and a fourth potential source that varies with changes in the condition; and means responsive to changes in the condition to simultaneously vary all four potential sources but at different rates, the ohmic resistance values of the various bridge arms being adjusted that the series current flowing in each of the first, second, third and fourth electro-magnetic devices varies with the respective rate of change in the first, second, third and fourth potential sources.

6. The invention as recited in claim 5, wherein the electro-magnetic devices are electrical indicating instruments having scales calibrated in terms of factors related to changes in the condition.

7. An electrical indicating system comprising a first circular potentiometer having a slider to be moved progressively in response to changes in a variable condition, a second potentiometer having a slider, means coupling said sliders to move the slider of the second potentiometer at a selected fraction of the rate of movement of the slider of the first potentiometer, independent and equal voltage sources connected to input sides of each potentiometer, a first four arm bridge energized by the potential output of the first potentiometer, a first indicating instrument connected in series between a junction of the first bridge and the first potentiometer, and a second four arm bridge having a second indicating instrument connected in one arm thereof, said second bridge constituting one arm of the first bridge; said second and first instruments having pointers which deflect at a rate corresponding directly to the selected rate of movement of the said second and first sliders.

References Cited in the file of this patent

UNITED STATES PATENTS 2,625,822    Nichols                Jan. 20, 1953